(12) United States Patent
Keeler et al.

(10) Patent No.: US 10,612,467 B2
(45) Date of Patent: Apr. 7, 2020

(54) ENGINE FUEL-OIL HEAT EXCHANGE SYSTEM

(71) Applicant: ROLLS-ROYCE plc, London (GB)

(72) Inventors: Benjamin J Keeler, Chesterfield (GB); Paul S McCabe, Tamworth (GB)

(73) Assignee: ROLLS-ROYCE PLC, London (GB)

( * ) Notice: Subject to any disclaimer, the term of this patent is extended or adjusted under 35 U.S.C. 154(b) by 45 days.

(21) Appl. No.: 15/044,534

(22) Filed: Feb. 16, 2016

(65) Prior Publication Data

US 2016/0265438 A1    Sep. 15, 2016

(30) Foreign Application Priority Data

Mar. 10, 2015 (GB) .................................. 1504005.8

(51) Int. Cl.
*F02C 7/14* (2006.01)
*F02C 7/224* (2006.01)

(52) U.S. Cl.
CPC ................ *F02C 7/14* (2013.01); *F02C 7/224* (2013.01); *F05D 2240/40* (2013.01); *Y02T 50/675* (2013.01)

(58) Field of Classification Search
CPC .. F02C 7/14; F02C 7/224; F02C 7/228; F02C 9/263; F05D 2240/40; F05D 2240/36; Y02T 50/675; F28D 2021/0021; F28D 2021/0049; F28D 2021/0089
See application file for complete search history.

(56) References Cited

U.S. PATENT DOCUMENTS

| | | | | |
|---|---|---|---|---|
| 3,300,965 | A | * | 1/1967 | Sherlaw .................... F02C 7/14 165/297 |
| 4,041,697 | A | * | 8/1977 | Coffinberry ............... F02C 7/14 123/41.33 |
| 4,104,873 | A | | 8/1978 | Coffinberry |
| 4,354,345 | A | | 10/1982 | Dreisbach, Jr. et al. |
| 4,696,156 | A | | 9/1987 | Burr et al. |
| 5,438,823 | A | * | 8/1995 | Loxley .................... F01D 25/18 165/41 |

(Continued)

FOREIGN PATENT DOCUMENTS

| | | |
|---|---|---|
| EP | 2 837 798 A1 | 2/2015 |
| GB | 997260 A | 7/1965 |
| WO | 2015/080778 A2 | 6/2015 |

OTHER PUBLICATIONS

Sep. 9, 2015 Search Report issued in British Patent Application No. 1504005.8.

(Continued)

*Primary Examiner* — Eric S Ruppert
*Assistant Examiner* — Hans R Weiland
(74) *Attorney, Agent, or Firm* — Oliff PLC

(57) ABSTRACT

A fuel-oil heat exchange system for an engine having a first fuel line for delivery of fuel to an engine combustor and a second fuel line for delivery of fuel to ancillary engine equipment. The heat exchange system has a first heat exchanger for transfer of heat from an engine oil system to the first fuel line and a second heat exchanger for transfer of heat from the engine oil system to the second fuel line. A control valve is provided for selective control of the oil flow from the engine oil system to the first and second heat exchangers.

19 Claims, 2 Drawing Sheets

(56) References Cited

U.S. PATENT DOCUMENTS

| | | | |
|---|---|---|---|
| 7,997,062 B2* | 8/2011 | Sun | F02C 7/224 |
| | | | 60/266 |
| 2010/0186943 A1 | 7/2010 | Sun et al. | |
| 2011/0232293 A1* | 9/2011 | Leese | F02C 7/224 |
| | | | 60/772 |
| 2014/0223917 A1 | 8/2014 | Gameiro et al. | |
| 2016/0201563 A1* | 7/2016 | Stearns | F02C 7/14 |
| | | | 60/776 |

OTHER PUBLICATIONS

Jun. 27, 2016 Search Report issued in European Patent Application No. 16 15 5897.

* cited by examiner

ENGINE FUEL-OIL HEAT EXCHANGE SYSTEM

This disclosure claims the benefit of UK Patent Application No. 1504005.8, filed on 10 Mar. 2015, which is hereby incorporated herein in its entirety.

BACKGROUND OF THE DISCLOSURE

The present disclosure relates to engine heat management systems and more particularly to engine fuel-oil heat exchangers, for example as used in gas turbine engines.

It is known for aircraft engines, and gas turbine engines more generally, to provide a fuel-oil heat exchanger such that heat energy transferred to the oil as it flows through hot portions of the engine can be transferred to the fuel prior to combustion, so as to improve cycle efficiency. Heat energy is typically transferred to the low pressure side of a fuel system, i.e. upstream of a fuel pump and fuel metering unit that control fuel flow to the engine combustor.

It is also known that excess heat energy may need to be dumped from the oil system by the use of one or more air cooler to prevent fuel temperatures becoming overly elevated. A conventional heat management system thus allows oil flow to selectively bypass one or more air cooler.

Ongoing efforts to improve the efficiency of gas turbine engines can result in less energy being available to heat the fuel. If fuel is not sufficiently heated it has been found that ice crystals can form, and reside, within the fuel flow.

Whilst the ice crystals are of generally small enough size to be accommodated in the flow to the combustors (i.e. the primary use of the fuel flow), problems have been found to occur where the fuel flow is used to drive ancillary equipment, such as hydraulic actuation systems (i.e. the secondary use of the fuel flow). In particular, certain high tolerance components such as servo valves and the like require small flow openings/clearances for which icing due to the ice crystals in the fuel flow can present a significant potential blockage.

It is an aim of the present disclosure to provide an engine fuel-oil heat exchange system that offers greater control. It may be considered an additional or alternative aim to provide an engine fuel-oil heat exchange system that can better safeguard temperature-sensitive equipment.

BRIEF SUMMARY OF THE DISCLOSURE

The disclosure results from the general premise of providing for alternative, and potentially more effective, distribution of the available heat energy from an engine's oil system to its fuel system.

According to a first aspect of the disclosure there is provided an engine fuel-oil heat exchange system for an engine having a first fuel line for delivery of fuel to an engine combustor and a second fuel line for delivery of fuel to ancillary engine equipment, the heat exchange system comprising: a first heat exchanger for transfer of heat from an engine oil system to the first fuel line; a second heat exchanger for transfer of heat from said engine oil system to the second fuel line; and a control valve for selective control of the oil flow from said engine oil system to the first and second heat exchangers.

The disclosure beneficially allows relative control of heat transfer from the hot oil within the oil system to each of the first and second fuel lines to accommodate the different functional requirements of the primary and secondary fuel delivery systems. The disclosure may allow prioritisation of a base or minimum level of heat transfer to one fuel line over the other.

Prioritising a base or minimum threshold level of heat transfer to the second fuel line over the first fuel line is generally counter-intuitive since the primary conventional purpose of the fuel is to supply the engine combustor requirements.

The first and second heat exchangers may be thermally isolated from each other, for example by being formed as separate or spaced heat exchanger units. The heat exchangers may be spaced by an air gap and/or a thermal insulation material. The first and second heat exchangers may be formed as distinct portions of a common heat exchanger housing.

The first and second heat exchangers may thus be mounted to suit the applicable space constraints on the heat management system aboard the engine.

The control valve allows selective control of the relative flow of oil to the first and second heat exchangers. The control valve may allow switching of oil flow from the first heat exchanger to the second, and/or vice versa. According to preferred embodiments the control valve allows variable control of the oil flow rates (e.g. concurrent flow rates) to each of the first and second heat exchangers. The control valve may allow the ratio of the available oil flow in the oil system to be divided between the first and second heat exchangers anywhere between 1:0 and 0:1. The control valve may be variably openable and/or range-taking.

The control valve may have an inlet connected to a pipe for delivery of hot oil from the engine oil system. A single or common hot oil inlet may be provided.

The control valve may comprise first and second outlets for fluid connection to the first and second heat exchangers respectively, for example via respective oil pipes.

A first oil flow path may be defined between the control valve and the first heat exchanger. A second oil flow path may be defined between the control valve and the second heat exchanger.

A further heat exchanger, such as for example an air cooler, may be arranged in the first flow path. A respective further control valve may allow selective bypassing of the further heat exchanger. The further heat exchanger may be upstream in an oil flow direction of the first heat exchanger.

The oil outlet of the first and/or second heat exchanger may be connected to an oil return path/pipe to the engine. An 'out' flow direction may be defined from the engine to the control valve. A 'return' flow direction may be defined from the first and/or second heat exchanger to the engine.

In some embodiments of the disclosure, the oil outlet of the second heat exchanger may be connected to the first flow path. An oil mixer may or may not be arranged to mix the oil leaving the second heat exchanger with the oil in the first flow path. The oil outlet of the second heat exchanger may be connected to the first flow path at a location downstream of a further heat exchanger.

The connecting of the outlet of the second heat exchanger with the inlet of the first heat exchanger beneficially allows the first heat exchanger to receive the cumulative mass flow of oil, which may enable the greatest possible maximum heat transfer to the fuel flowing to the combustors. This may allow flexibility to improve cycle efficiency as far as possible and/or reduce the need to waste excess heat energy in the second oil flow path.

The first heat exchanger may be connected in the first fuel line between a fuel tank and an engine combustor. The first heat exchanger may be connected in the first fuel flow line upstream of a first fuel pump and/or a fuel metering unit.

The first and/or second heat exchanger may be connected to said respective first and second fuel flow lines in a low pressure portion of the fuel system. A fuel outlet of each of the first and second heat exchanger may be connected to a respective first and second fuel pump. The first and/or second fuel pump may comprise a high pressure fuel pump, for example as distinct from a low pressure pump for fuel flow in the low pressure portion of the fuel system from the fuel tanks.

The second heat exchanger may be connected in the second fuel line between a fuel tank and one or more hydraulic unit. The second heat exchanger may be connected in the second fuel flow line upstream of the second fuel pump and/or a fuel metering unit.

A temperature sensor may be provided in the first and or second fuel line. A temperature sensor may be provided upstream and/or downstream of the respective heat exchanger in the/each fuel line.

One or more temperature sensor may be provided in the oil system, for example upstream of the control valve and/or in the first and/or second oil flow path.

A controller may be provided for operation of the control valve. The controller may comprise machine readable instructions, typically in the form of one or more module of code and/or control algorithm, for determining a control signal to output to the control valve based on received inputs. A fuel hydro-mechanical and/or metering unit controller may be used as the control valve controller.

A feedback loop may be provided between the control valve and controller.

Operation of the control valve may be controlled in accordance with one or more fuel and/or oil temperature reading within the system. A plurality of temperature readings may provide inputs to the controller. One or more fluid pressure reading in the system may also be used in determining operation of the control valve.

A hierarchy of heating demands may be defined, for example within the heat exchanger/valve control scheme. The hierarchy may or may not be predetermined.

The control valve may be controlled to prioritise heating of the second fuel line (i.e. to increase or divert oil flow to the second heat exchanger) if the fuel temperature therein falls below a threshold value. The threshold value may be indicative of possible ice formation/freezing within the fuel line and may be substantially 0° C., or below. A small positive temperature threshold above the freezing point may be used as a safety margin.

The control valve may be controlled to prioritise heating of the first fuel line (i.e. to increase or divert oil flow to the first heat exchanger) if the fuel temperature in the second fuel flow line is above the threshold value. Thus the disclosure can allow prioritisation of the functional requirements of ancillary equipment fed by the high pressure fuel system above engine combustion/cycle efficiency. Above the threshold temperature, the system allows combustion/cycle efficiency to be increased as far as possible based on the current oil temperature constraint.

The control valve may be controlled to prevent heating of the fuel in either or both of the first and second fuel line beyond a maximum threshold temperature. The maximum temperature threshold for the first and second fuel lines may be the same or different. Preferably the maximum temperature threshold for the second fuel line is lower than the maximum temperature threshold for the first fuel line.

The control system may operate automatically and/or substantially in real time in response to sensor readings.

According to a second aspect of the disclosure, there is provided a data carrier comprising machine readable instructions for the control of the control valve within the system of the first aspect.

Wherever practicable, any of the essential or preferable features defined in relation to any one aspect of the disclosure may be applied to any further aspect. Accordingly the disclosure may comprise various alternative configurations of the features defined above.

BRIEF DESCRIPTION OF THE DRAWINGS

Practicable embodiments of the disclosure are described in further detail below by way of example only with reference to the accompanying drawings, of which.

DETAILED DESCRIPTION OF THE DISCLOSURE

Figure 1:
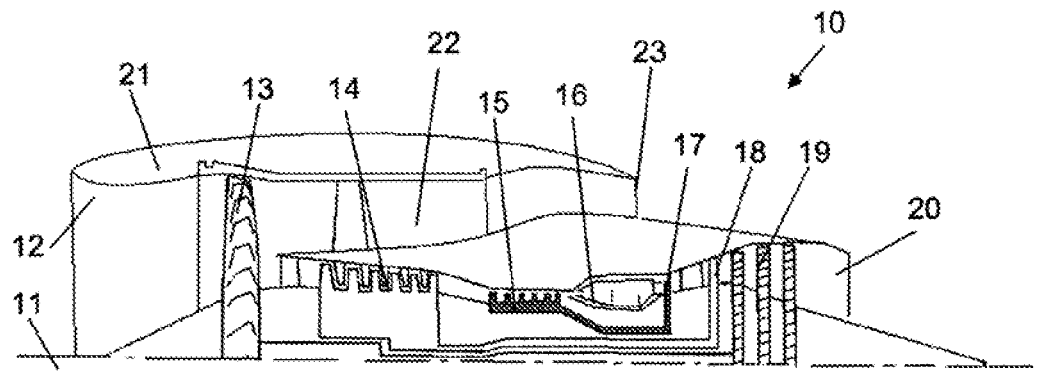
FIG. 1 shows a half longitudinal section through a gas turbine engine to which the disclosure may be applied.

With reference to FIG. 1, a ducted fan gas turbine engine generally indicated at 10 has a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and a core engine exhaust nozzle 20. A nacelle 21 generally surrounds the engine 10 and defines the intake 12, a bypass duct 22 and a bypass exhaust nozzle 23.

The gas turbine engine 10 works in a conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high, intermediate and low-pressure turbines 17, 18, 19 respectively drive the high and intermediate pressure compressors 15, 14 and the fan 13 by suitable interconnecting shafts.

Alternative gas turbine engine arrangements may comprise a two, as opposed to three, shaft arrangement and/or may provide for different bypass ratios. Other configurations known to the skilled person include geared turbofan engines, open rotor designs, such as turboprop engines, or else turbojets, in which the bypass duct is removed such that all air flow passes through the core engine. In certain configurations, the torque from one or more engine shaft may be used to generate electrical power instead of, or in addition to, driving airflow. The various available gas turbine engine configurations are typically adapted to suit an intended operation which may include aerospace, marine, power generation amongst other propulsion or industrial pumping applications.

Figure 2:
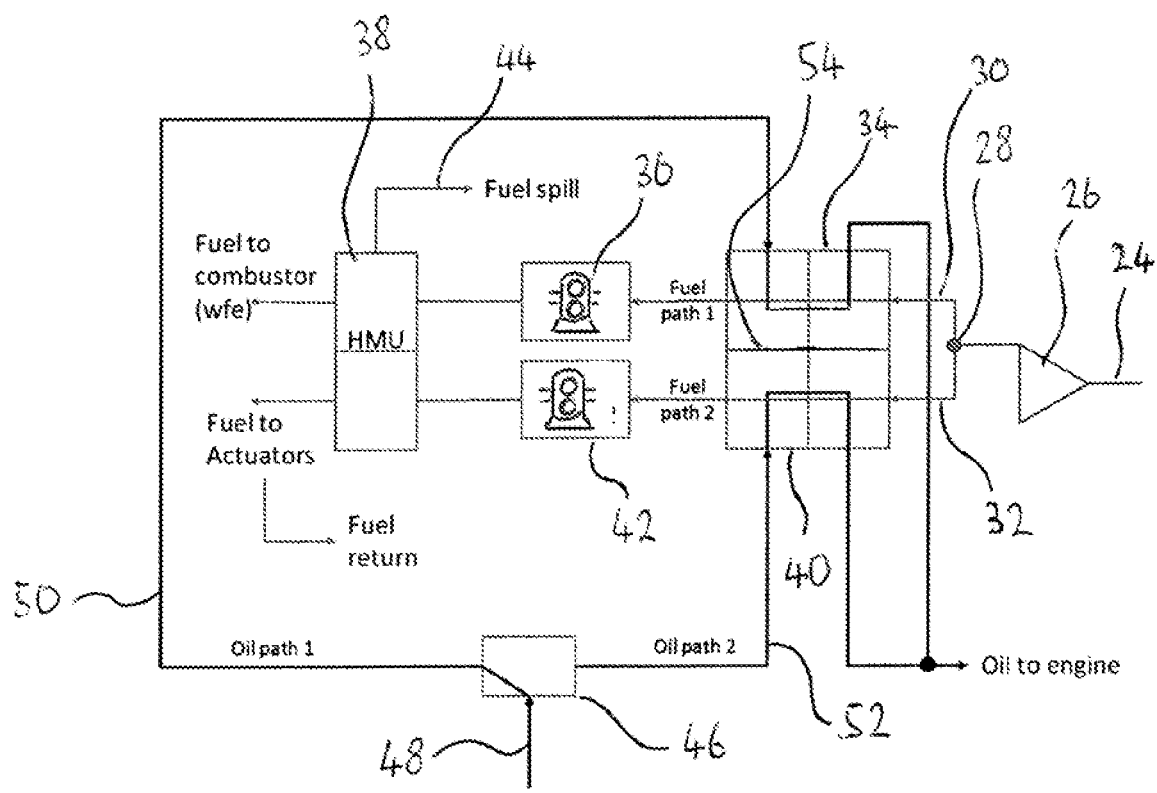
FIG. 2 shows a schematic layout of a fuel-oil heat exchange system according to one example of the disclosure.

Turning to FIG. 2, there is shown a possible arrangement for a heat management system for use within a gas turbine engine of the kind described above. The system comprises a common fuel line 24 leading from a conventional fuel tank or network of fuel tanks (not shown) and a low pressure fuel pump 26 for pumping engine fuel, such as kerosene, within the low pressure side of the aircraft/engine fuel system. A junction 28 in the fuel line 24 splits the fuel line 24 into a first fuel line 30 and a second fuel line 32.

The first fuel line 30 defines a fuel path to the one or more combustor on the engine (i.e. combustion equipment 16 shown in FIG. 1), typically to a plurality of fuel injectors (not shown) leading into a combustion chamber within combustion equipment 16.

The fuel path of fuel line 30 comprises the following fuel flow equipment in flow series in a direction of flow from the fuel line 24 towards the combustion equipment:

A first fuel-oil heat exchanger (FOHE) 34
A fuel pump 36 for driving fuel flow to the combustion equipment
A fuel metering unit 38

The fuel path of fuel line 32 comprises the following fuel flow equipment in flow series in a direction of flow from the fuel line 24 towards the relevant ancillary equipment on board the engine:

A second fuel-oil heat exchanger (FOHE) 40
A fuel pump 42 for driving fuel flow to the ancillary/hydraulic equipment
Fuel metering/hydro-mechanical unit 38

Whilst not shown for simplicity, it will be appreciated that each flow line 30,32 will typically comprise a fuel filter, for example downstream or upstream of the fuel pump 36, 42. A suitable bypass may also be accommodated, particularly on the main fuel line filter.

The fuel pumps 36 and 42 are functionally separate and operate independently to satisfy the specific fuel flow requirements of their respective systems. Each fuel pump 36 and 42 may be of either a fixed/positive displacement or variable displacement design. A conventional gear pump may be used, such as a single/multi stage (e.g. dual stage) gear pump. Each pump may be of common or different design according to their specific pumping requirements.

The fuel metering unit 38 is a hydromechanical unit (HMU) and may be of a generally conventional mechanical design, typically comprising one or more metering valve and/or shut off valve for each fuel line 30, 32. Whilst described herein as a metering unit, the unit 38 may have one or more other hydromechanical functions, e.g. for setting fuel pressure.

The unit 38 also comprises a spill valve, leading to a fuel spill/return line 44 for returning fuel from the high pressure side of the fuel system (i.e. downstream of the pump 36 or 42) to the low pressure side of the fuel system (i.e. upstream of pumps 36 and 42). The line 44 may return fuel either upstream or downstream of the heat exchanger 34 and/or 40 according to different potential configurations.

A common fuel metering unit 38 is provided for both fuel lines 30,32 although it will be appreciated that any or any combination of metering, pressure setting and/or shut off of the different fuel lines can be controlled independently, thereby preserving the separate nature of the fuel lines.

The metering unit 38 may have on-board control means in the form of one or more data processor for receiving the relevant sensor/control inputs and outputting control signals for actuation of the relevant valves. In the examples disclosed herein, such a controller may also be programmed to control operation of control valve 46 to be described hereinbelow. Thus, whilst the mechanical arrangement of the metering unit 38 may be conventional, the controller therein may be novel in accordance with the functional requirements of the fuel system. In other examples, the relevant control signals may be generated by another control unit capable of receiving/outputting data signals over the relevant local communication network and processing the relevant signal inputs. Such a controller would typically, although not essentially be mounted onboard the engine.

The operation/speed of the fuel pumps 36 and 42 is typically governed/driven by engine shaft speed but could otherwise be driven by an electric or other power source e.g. under the control of a suitable controller. The pressure and/or flow rate to the combustor/actuation system may be controlled with consideration of the fuel temperature and change in pressure (ΔP).

Fuel in fuel line 32 is pumped and metered in order to meet the fluid supply pressure/flow rate requirements of ancillary equipment on the engine. Such equipment typically comprises a plurality of hydraulic machines/assemblies which require adequate fluid pressure for operation. The invention is not limited to any specific ancillary equipment but may accommodate, for example, actuation systems such as variable stator vane actuators, blade tip clearance control mechanisms, etc.

It has been found that certain ancillary equipment comprises components or sub-assemblies that are particularly sensitive to ice crystals within the fuel flow. Examples of such components comprise servo valves, which have small flow clearances and tight manufacturing tolerances, and also fine filters.

Turning back to FIG. 2, the heat management system comprises an oil inlet pipe 48 which leads from the engine oil system to the heat management system of the present invention. The oil inlet pipe 48 is connected to control valve 46 having two outlets so as to define two distinct oil pipes/paths 50, 52 in the heat management system. Accordingly the oil line 48 is effectively bifurcated by the control valve 46 which allows selective control of oil flow to either of both paths 50, 52 at any one time.

The first oil path 50 leads to the first heat exchanger 34 for transfer of heat energy from the oil flow to the first fuel line 30. Accordingly the first heat exchanger has an oil inlet and outlet. The oil outlet provides a return path to the engine oil system.

The second oil path 52 leads to the second heat exchanger 40 for transfer of heat energy from the oil flow to the second fuel line 32. Accordingly the second heat exchanger 40 has an oil inlet and outlet. The oil outlet of the second heat exchanger 40 provides a return flow path to the engine oil system. Thus the oil system portion of the heat management system, when connected to the engine oil system provides a circuit therewith such that heated oil is received form the engine oil system and cooled in the heat management system before returning to the engine oil system for reuse in engine tribology, cooling and/or vibration damping applications.

In this example of the invention, it can be seen that the oil outlets of the respective heat exchangers are connected to pipes which lead directly back to the engine oil system. Thus upon exiting the heat exchangers, no further oil-fuel heat exchange is undertaken. The two oil paths 50 and 52 may be rejoined at this point such that a single, common return flow path to the engine is provided.

Each of the fuel-oil heat exchangers 34 and 40 may be of a generally conventional type. However the heat exchangers 34 and 40 may be formed as a common unit as shown in FIG. 2 wherein the two heat exchanger portions are thermally isolated, for example by a thermal barrier or insulation material 54 as shown in FIG. 2. This may provide for a small form factor which may be beneficial within the engine space constraints. A common housing for the two heat exchangers may also ease installation of the system. Alternatively, an air gap may be provided between the two heat exchangers and/or the heat exchangers could be separately mounted at spaced locations on the engine so as to ensure thermal isolation and/or fit within available space constraints. The functional importance of the two heat exchangers are that there are two distinct heat energy paths defined, so as to allow improved methods of control of heat transfer into the two fuel lines 30 and 32.

Irrespective of whether the two heat exchangers are formed as a single unit, the flow paths through each heat exchanger could either be the same or different. For example the diameter of the oil and/or fuel flow passages may differ between the two heat exchangers. Additionally or alternatively, the path/geometry of the flow passages within the different heat exchangers could potentially differ, for example according to any or any combination of: the number of passes of each flow passage; the length of each pass; and the number or orientation of flow passages. Thus it will be appreciated that each heat exchanger could be tailored to the specific heating requirements of each fuel flow system.

The precise form of the control valve 46 is dependent on the control requirements for the system. In some examples, a simple two-state control valve (i.e. a valve for switching flow between paths 50 and 52) may suffice. Such a valve may be switched back and forth to control oil flow, and thereby heat transfer, to each heat exchanger. In other embodiments, a variable flow valve, such as a modulating or stepped flow valve may be provided so that the flow to each oil path can be varied across a suitable range, typically the entire range of flow ratios between oil paths 50 and 52. Although a single valve 46 is described and shown, it will be appreciated that a plurality of valves could be used to achieve the desired oil flow control between the two flow paths in other embodiments.

An oil temperature sensor is provided in flow line 48 for the temperature of the incoming oil, upstream of the control valve 46. One or more fuel temperature sensor is provided either in the fuel line 24 or in either or both of fuel lines 30, 32 upstream of the heat exchangers 34 and 40. Additional temperature sensors may be included in the oil and/or fuel flow lines downstream of either or both of heat exchangers 34, 40, for example to be able to determine the temperature rise/drop in one or more flow through the heat exchanger.

Fluid pressure and/or flow rate may also be measured at one or more suitable location in any or any combination of flow lines.

Sensor readings are communicated to the controller for the system (as described above) and processed to determine a suitable setting for control valve 46 in order to achieve a flow in either or both of oil paths 50, 52 that corresponds to the determined heating requirement and/or thermal capacity for each fuel flow line 30, 32. Table 1 below shows the basic control rationale for different fuel temperature scenarios.

| Inlet/tank fuel temp | Oil split | Rationale |
| --- | --- | --- |
| <0° C. | Oil preferentially sent through oil path 52. | Preferentially raise fuel temp in path 32 to above 0° C., thus protecting sensitive components downstream of fuel pump 42 from ice crystals |
| | Some oil flow could remain through oil path 50 | Oil flow split also set so as not to overheat individual fuel and oil flow paths |
| >0° C. | Oil preferentially sent through oil path 50. | Run fuel path 32 cool under typical operation for life benefit (improve reliability and disruption). Majority of oil heat sunk to fuel path 30 which returns energy to the cycle through the combustor (specific fuel consumption benefit). |
| | Some oil flow could remain through oil path 52 | Oil flow split also set so as not to overheat individual fuel and oil flow paths or components in fuel line 30 |

It will be appreciated that, whilst the lower threshold of 0° C. has been set for deciding whether to prioritise heating to fuel fine 32, a different (typically higher) threshold may otherwise be set. The common control aim is that a minimum fuel temperature threshold for flow line 32 is set, wherein a specific oil flow regime to the heat exchanger 40 is set in the even that fuel temperature falls below that minimum threshold.

Similarly, given the sensitive nature of the ancillary equipment fluid-washed components, a maximum threshold for the temperature of the fuel exiting the heat exchanger 40 in fuel line 32 may also be set. In the event that the fuel temperature in flow line 32 exceeds the maximum threshold a further flow regime may be established, whereby the oil flow to heat exchanger 40 is avoided as far as possible. The ability to improve the life of ancillary equipment fluid devices is a potential further benefit of the invention. Furthermore, it has been found that controlling/narrowing the temperature range of operation of the ancillary equipment may reduce tolerance considerations on that equipment, thereby reducing cost/complexity and/or improving accuracy of operation over the reduced temperature range.

Furthermore a maximum fuel temperature threshold for fuel line 30 may be established, which may differ from that for fuel line 32, e.g. to prevent overheating of the fuel to the combustor. The max fuel temperature threshold in line 30 will thus typically be higher than in line 32.

Figure 3:
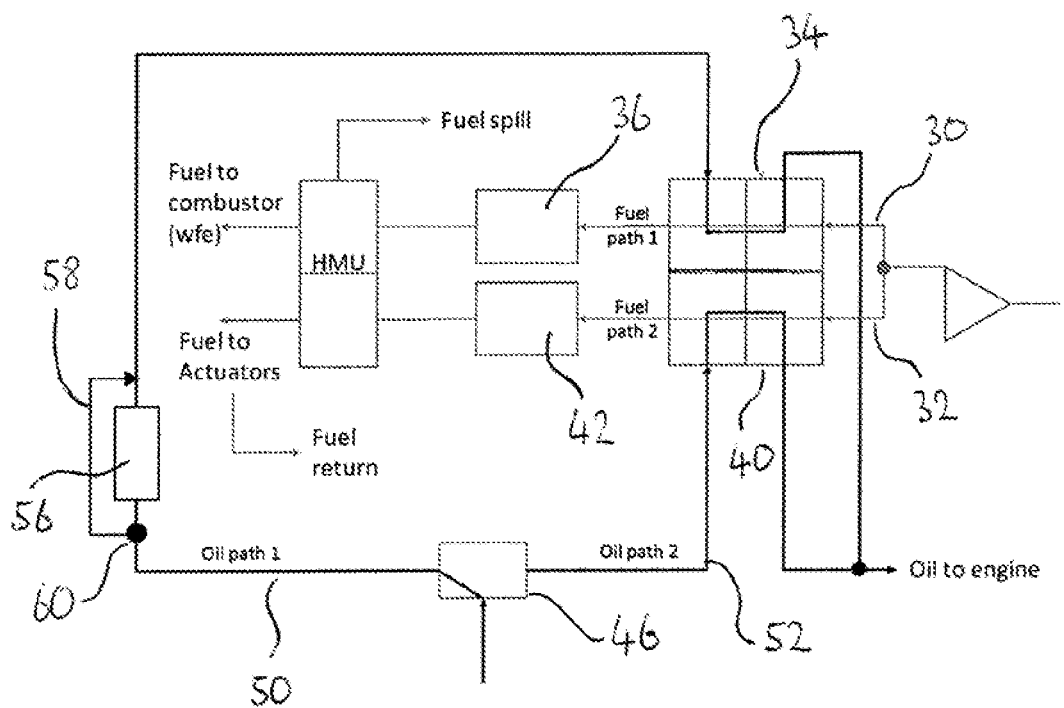
FIG. 3 shows the layout of FIG. 2 with a further optional heat exchanger.

In the event that both maximum temperature thresholds are exceeded for lines 30 and 32, it may be required to dump heat energy to prevent it entering the fuel system. One or more additional cooler 56 could be provided for this purpose, for example as shown in the embodiment of FIG. 3. The system of FIG. 3 is the same as that for FIG. 2, except that it includes a further heat exchanger 56 (in this example an air cooler) to allow selective removal of heat from the oil path 50 upstream of heat exchanger 34. The further heat exchanger 56 has a bypass line 58 and an associated valve 60 for selective passage of oil through, or around, the further heat exchanger. The bypass line 58 and associated valve 60 are optional.

Thus the disclosure can ensure the maximum possible proportion of the available heat energy within the engine oil system is reused in a manner that balances efficiency savings with the specific requirements of each of the primary and secondary functions of the engine fuel system.

Whilst the further heat exchanger 56 is shown in oil path 50, having a separate control valve 60, it is possible that the control valve arrangement at 46 could accommodate another oil flow path for the further heat exchanger. At the outlet of the further heat exchanger, the further flow path could feed into the return oil line to the engine, or else into the oil path 50 upstream of the heat exchanger 34.

Figure 4:
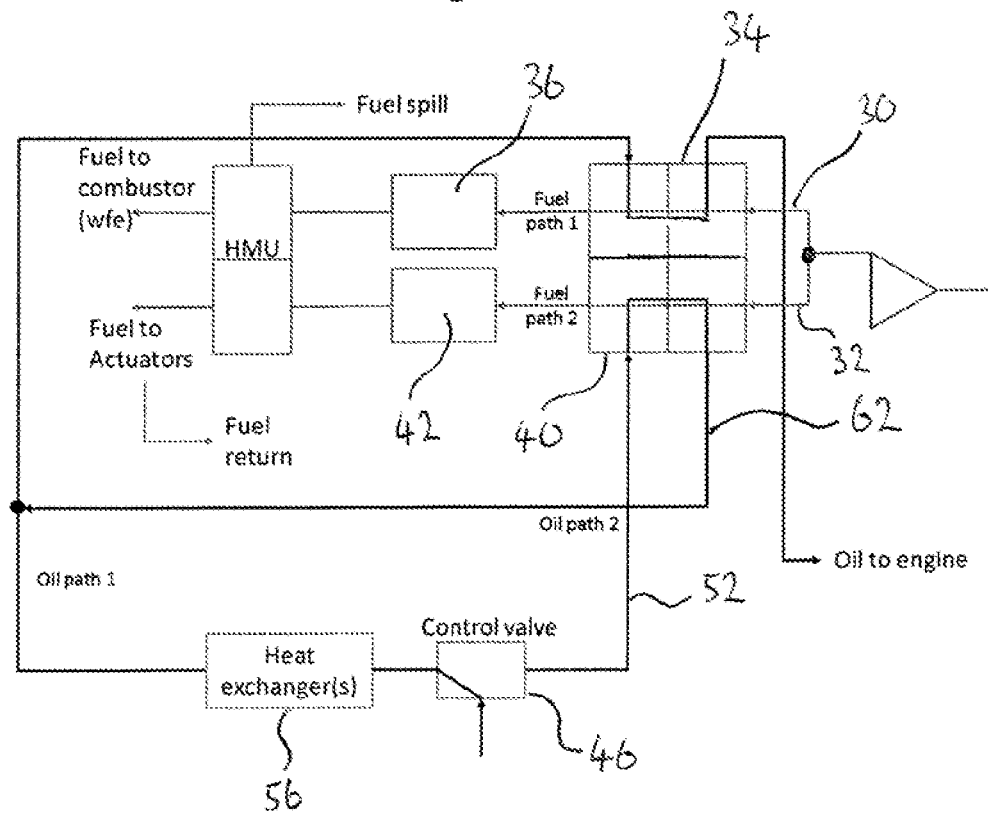
FIG. 4 shows a schematic layout of a fuel-oil heat exchange system according to another example of the disclosure

In FIG. 4 a further example of the disclosure is shown which is the same as any of the systems described above with respect to FIG. 2 or FIG. 3 save that the oil outlet 62 from heat exchanger 40 feeds into oil path 50 upstream of heat exchanger 34. Thus the oil fed to heat exchanger 40 would also subsequently pass through heat exchanger 34. This may ensure that the engine fuel flow in line 30 achieves some heating (and associated thermal efficiency increase) even when heating of flow line 32 is prioritised.

As above, an optional further heat exchanger 56 may be provided to dump excess heat in the oil flow. That heat exchanger may or may not have a bypass, in this or any other example of the disclosure, dependent on control requirements and desired complexity of the system. Whilst an air cooler is deemed the most likely form of further heat exchanger, it is not to be ruled out that a different heat sink could be used or a heat exchanger could be used to supply a further, lower priority heating requirement for the engine or associated equipment.

For the control of the above described systems, it is envisaged that an open loop control scheme may be suitable given the generally predictable thermodynamic behaviour of the system. That is to say the system may be modelled as a one-dimensional heat flow system using simple parameter models for each of the relevant components. Such a model can be used to determine suitable control valve settings for different sensor reading scenarios. In other examples, a closed loop feedback control system may be implemented, wherein the impact of control valve changes on the thermodynamic behaviour of the system can be monitored so as to allow the controller to continually react to the transient nature of the heat transfer requirements.

What is claimed is:

1. An engine fuel-oil heat exchange system for an engine, the heat exchange system comprising:
   a first fuel line configured to deliver fuel to an engine combustor;
   a second fuel line configured to deliver fuel to ancillary engine equipment, the first fuel line and the second fuel line being bifurcated, at a junction between the first fuel line and the second fuel line, from a fuel supply line, the first fuel line extending beginning at the junction and ending at the engine combustor, the second fuel line extending beginning at the junction and ending at the ancillary engine equipment, the second fuel line being a separate fuel line from the first fuel line without sharing any portion of the first fuel line, the first fuel line not extending to the ancillary engine equipment and the second fuel line not extending to the engine combustor, the first fuel line and the second fuel line each extending through a common fuel metering unit upstream of the engine combustor and the ancillary engine equipment but downstream of a fuel pump;
   a first heat exchanger configured to transfer heat from an engine oil system to the first fuel line;
   a second heat exchanger configured to transfer heat from the engine oil system to the second fuel line;
   a control valve configured to switch between allowing oil flow from the engine oil system to the first heat exchanger and allowing oil flow from the engine oil system to the second heat exchanger; and
   a temperature sensor configured to measure a fuel temperature in the second fuel line,
   wherein the control valve is configured to prioritize oil flow to the second heat exchanger if the fuel temperature in the second fuel line is below 0° C.

2. The system of claim 1, wherein the control valve is configured to control relative flow of oil to the first heat exchanger and to the second heat exchanger as a proportion of a total oil flow into the system.

3. The system of claim 1, wherein the control valve is configured to variably control oil flow rates when oil flows concurrently to the first heat exchanger and to the second heat exchanger.

4. The system of claim 1, wherein the first heat exchanger and the second heat exchanger are thermally isolated from each other.

5. The system of claim 1, wherein the first heat exchanger and the second heat exchanger both comprise distinct portions of a common heat exchanger housing.

6. The system of claim 1, wherein the control valve has an inlet connected to a pipe for delivery of oil from the engine oil system.

7. The system of claim 1, wherein the control valve has first and second outlets for respective fluid communication with the first heat exchanger and the second heat exchanger.

8. The system of claim 1, wherein a further heat exchanger is arranged in a first oil path, upstream of the first heat exchanger, for selective removal of heat from the oil flow in the system.

9. The system of claim 1, wherein an oil outlet of the first heat exchanger and/or the second heat exchanger is connected to an oil return pipe to the engine.

10. The system of claim 9, wherein the oil outlet of the second heat exchanger is connected to a first oil path at a location upstream of the first heat exchanger.

11. The system of claim 1, wherein the first heat exchanger and/or the second heat exchanger is connected in the respective fuel line upstream of the fuel pump and the fuel metering unit.

12. The system of claim 1, further comprising a controller configured to output a control signal to the control valve based on received temperature sensor readings from the temperature sensor.

13. The system of claim 1, wherein the control valve is configured to be operated according to a hierarchy of heating demands for the first fuel line and the second fuel line, wherein a requirement for the fuel temperature of the second fuel line to be above a predetermined threshold ranks higher than a requirement to heat the first fuel line.

14. The system of claim 13, wherein the predetermined threshold temperature is approximately 0° C.

15. The system of claim 1, wherein the control valve is configured to be controlled to divert oil flow away from the second heat exchanger and/or towards the first heat exchanger in the event that a maximum temperature threshold for the second fuel line is met or exceeded.

16. The system of claim 1,
   wherein the first heat exchanger has an inlet of the oil flow and an outlet of the oil flow, the outlet of the first heat exchanger being downstream of the oil flow from the inlet of the first heat exchanger,
   the second heat exchanger has an inlet of the oil flow and an outlet of the oil flow, the outlet of the second heat exchanger being downstream of the oil flow from the inlet of the second heat exchanger,
   the first heat exchanger is located on a first oil path that extends beginning at the control valve and ending at the outlet of the first heat exchanger, the second heat exchanger is located on a second oil path that extends beginning at the control valve and ending at the outlet of the second heat exchanger, the second oil path is a separate oil path from the first oil path without sharing any portion of the first oil path.

17. A controller comprising machine readable instructions for controlling a control valve within an engine fuel-oil heat exchange system for an engine having a first fuel line that is configured to deliver fuel to an engine combustor, a second fuel line that is configured to deliver fuel to ancillary engine equipment, a first heat exchanger that is configured to transfer heat from an engine oil system to the first fuel line, a second heat exchanger that is configured to transfer heat from the engine oil system to the second fuel line, and a temperature sensor that is configured to measure a fuel temperature in the second fuel the first fuel line and the second fuel line being bifurcated, at a junction between the first fuel line and the second fuel line, from a fuel supply line, the first fuel line extending beginning at the junction and ending at the engine combustor, the second fuel line extending beginning at the junction and ending at the ancillary engine equipment, the second fuel line being a separate fuel line from the first fuel line without sharing any portion of the first fuel line, the first fuel line not extending to the ancillary engine equipment and the second fuel line not extending to the engine combustor, the first fuel line and the second fuel line each extending through a common fuel metering unit upstream of the engine combustor and the ancillary engine equipment but downstream of a fuel pump;

the controller being arranged to switch between allowing oil flow from the engine oil system to the first heat exchanger and allowing oil flow from the engine oil system to the second heat exchanger such that the control valve prioritizes oil flow to the second heat exchanger if the fuel temperature in the second fuel line is below 0° C.

18. The controller of claim 17, wherein the first heat exchanger has an inlet of the oil flow and an outlet of the oil flow, the outlet of the first heat exchanger being downstream of the oil flow from the inlet of the first heat exchanger, the second heat exchanger has an inlet of the oil flow and an outlet of the oil flow, the outlet of the second heat exchanger being downstream of the oil flow from the inlet of the second heat exchanger, the first heat exchanger is located on a first oil path that extends beginning at the control valve and ending at the outlet of the first heat exchanger, the second heat exchanger is located on a second oil path that extends beginning at the control valve and ending at the outlet of the second heat exchanger, the second oil path is a separate oil path from the first oil path without sharing any portion of the first oil path.

19. An engine fuel-oil heat exchange system for an engine, the heat exchange system comprising:

a first fuel line configured to deliver fuel to an engine combustor;

a second fuel line configured to deliver fuel to ancillary engine equipment, the first fuel line not extending to the ancillary engine equipment and the second fuel line not extending to the engine combustor, the first fuel line and the second fuel line each extending through a common fuel metering unit upstream of the engine combustor and the ancillary engine equipment but downstream of a fuel pump;

a first heat exchanger configured to transfer heat from an engine oil system to the first fuel line;

a second heat exchanger configured to transfer heat from the engine oil system to the second fuel line;

a control valve configured to switch between allowing oil flow from the engine oil system to the first heat exchanger and allowing oil flow from the engine oil system to the second heat exchanger; and a temperature sensor configured to measure a fuel temperature in the second fuel line, wherein the control valve is configured to prioritize oil flow to the second heat exchanger if the fuel temperature in the second fuel line is below 0° C., the first heat exchanger has an inlet of the oil flow and an outlet of the oil flow, the outlet of the first heat exchanger being downstream of the oil flow from the inlet of the first heat exchanger, the second heat exchanger has an inlet of the oil flow and an outlet of the oil flow, the outlet of the second heat exchanger being downstream of the oil flow from the inlet of the second heat exchanger, the first heat exchanger is located on a first oil path that extends beginning at the control valve and ending at the outlet of the first heat exchanger, the second heat exchanger is located on a second oil path that extends beginning at the control valve and ending at the outlet of the second heat exchanger, the second oil path is a separate oil path from the first oil path without sharing any portion of the first oil path.

* * * * *